United States Patent
Matsunaga et al.

(10) Patent No.: US 10,618,209 B2
(45) Date of Patent: Apr. 14, 2020

(54) TWO-COLOR MOLDED ARTICLE

(71) Applicant: KOITO MANUFACTURING CO., LTD., Tokyo (JP)

(72) Inventors: Kenichi Matsunaga, Shizuoka (JP); Katsuhisa Yorimasa, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 276 days.

(21) Appl. No.: 15/621,045

(22) Filed: Jun. 13, 2017

(65) Prior Publication Data

US 2017/0361515 A1 Dec. 21, 2017

(30) Foreign Application Priority Data

Jun. 16, 2016 (JP) .................. 2016-120209

(51) Int. Cl.
| | |
|---|---|
| *B32B 3/04* | (2006.01) |
| *B32B 27/08* | (2006.01) |
| *B29C 45/16* | (2006.01) |
| *F21S 41/00* | (2018.01) |
| *B32B 27/30* | (2006.01) |

(Continued)

(52) U.S. Cl.
CPC .......... *B29C 45/16* (2013.01); *B29C 45/1657* (2013.01); *B32B 3/04* (2013.01); *B32B 27/08* (2013.01); *B32B 27/308* (2013.01); *B32B 27/36* (2013.01); *F21S 41/00* (2018.01); *B29C 2045/1668* (2013.01); *B29K 2101/00* (2013.01); *B29K 2995/0021* (2013.01); *B32B 2250/02* (2013.01); *B32B 2250/24* (2013.01); *B32B 2250/44* (2013.01); *B32B 2307/402* (2013.01); *B32B 2307/41* (2013.01); *B32B 2307/412* (2013.01); *B32B 2307/414* (2013.01); *B32B 2307/416* (2013.01); *B32B 2605/006* (2013.01)

(58) Field of Classification Search
CPC . B29C 45/16; B29C 45/1679; B29C 45/1675; B29C 45/1676; B29C 45/1615; B29C 45/26; B32B 3/04; B32B 27/08; F21S 41/00
USPC .................................... 428/189, 192
See application file for complete search history.

(56) References Cited

U.S. PATENT DOCUMENTS

| | | | |
|---|---|---|---|
| 2007/0196626 A1* | 8/2007 | Summerer | ........ B29C 45/14065 428/192 |
| 2015/0306838 A1 | 10/2015 | Ito | |

FOREIGN PATENT DOCUMENTS

| | | |
|---|---|---|
| CN | 105014872 A | 11/2015 |
| FR | 3026338 A1 | 4/2016 |
| JP | 2000-153566 A | 6/2000 |

(Continued)

OTHER PUBLICATIONS

Communication dated Mar. 11, 2019, from the State Intellectual Property Office of People's Republic of China in counterpart Application No. 201710461687.2.

*Primary Examiner* — Catherine A. Simone

(74) *Attorney, Agent, or Firm* — Sughrue Mion, PLLC

(57) ABSTRACT

A two-color molded article includes a first resin part, and a second resin part in contact with the first resin part so as to at least partially overlap the first resin part. The second resin part includes a single layer region provided between a first region and a second region and provided in a penetrating portion formed between a first portion and a second portion. The single layer region has a joint portion in contact with a (Continued)

bent portion. The joint portion is formed in a convex shape with respect to the bent portion.

5 Claims, 5 Drawing Sheets

(51) Int. Cl.
*B32B 27/36* (2006.01)
*B29K 101/00* (2006.01)

(56) References Cited

FOREIGN PATENT DOCUMENTS

| JP | 2014-176974 A | 9/2014 |
|---|---|---|
| WO | 2014142062 A1 | 9/2014 |

\* cited by examiner

100

100

TWO-COLOR MOLDED ARTICLE

CROSS-REFERENCE TO RELATED APPLICATION

The present application claims priority from Japanese Patent Application No. 2016-120209 filed on Jun. 16, 2016, the entire content of which is incorporated herein by reference.

BACKGROUND

Technical Field

The present invention relates to a two-color molded article.

As a method of injection molding, there is known a technique for producing a two-color molded article by forming a primary molded article and then forming a secondary molded article around the primary molded article. The two-color molding technique is used, for example, in manufacturing a translucent cover of a lamp such as a headlamp of a vehicle (see Patent Document 1).

Patent Document 1: Japanese Patent Laid-Open Publication No. 2014-176974

When an interface between the primary molded article and the secondary molded article can be visually recognized from the outside, the interface may appear to shine, which may cause deterioration in appearance quality of the two-color molded article.

SUMMARY

Exemplary embodiments of the invention provide a two-color molded article whose appearance quality is improved.

A two-color molded article according to an exemplary embodiment, comprises:
a first resin part; and
a second resin part in contact with the first resin part so as to at least partially overlap the first resin part,
wherein the first resin part includes
a first surface portion,
a second surface portion facing in a direction different from a direction in which the first surface portion faces, and
a bent portion connecting the first surface portion and the second surface portion,
wherein the second resin part includes
a first region in contact with a back side of a first portion constituting a part of the first surface portion so as to overlap the first portion,
a second region in contact with a back side of a second portion constituting a part of the first surface portion so as to overlap the second portion, the second portion being different from the first portion, and
a single layer region provided between the first region and the second region and provided in a penetrating portion formed between the first portion and the second portion,
wherein the single layer region has a joint portion in contact with the bent portion, and
wherein the joint portion is formed in a convex shape with respect to the bent portion.

According to this aspect, the interface between the bent portion of the first resin part and the joint portion of the second resin part is not flat. Therefore, the rate at which external light is directly reflected to a viewer when seeing the interface from one of the first resin part and the second resin part is reduced, so that the appearance quality of the two-color molded article is improved.

The joint portion may have a curved surface. In this way, the rate at which external light is directly reflected to a viewer when seeing the interface from one of the first resin part and the second resin part is further reduced. Further, the whole of the joint portion may be a curved surface.

The joint portion may be formed such that R of the curved surface is in the range of 1 to 3 mm. In this way, it is easy for external light to scatter and it is possible to reduce the occurrence of an unfilled region in which resin is not filled in the corner of the mold.

The joint portion may have an inclined surface formed so as to be away from the bent portion toward a surface from the inside of the single layer region. In this way, a part of the joint portion is seen farther as viewed from the side of the bent portion of the first resin part, so that the influence of reflection of external light at the interface can be reduced.

Meanwhile, any combination of the above components and the transformation of expressions of the present invention among methods, apparatus and systems and the like are also effective as an aspect of the present invention.

According to the present invention, it is possible to improve the appearance quality in the two-color molded article.

DETAILED DESCRIPTION

Figure 1:
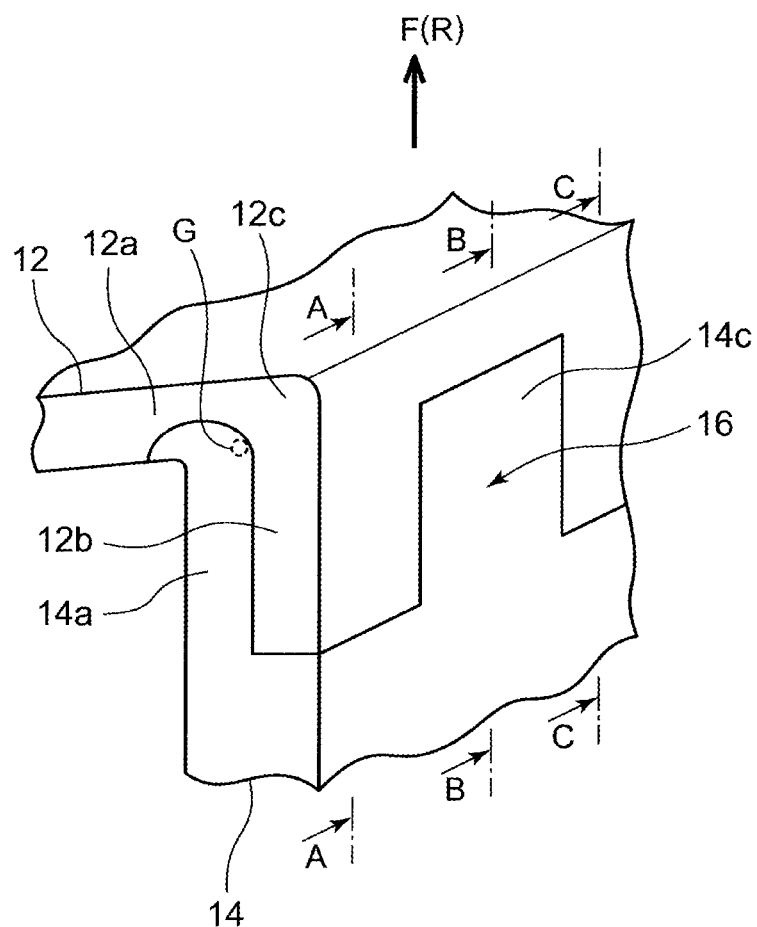
FIG. 1 is a cross-sectional perspective view of a main part of a two-color molded article according to a reference example.

Hereinafter, modes for carrying out the present invention will be described in detail with reference to the drawings and the like. Meanwhile, in the description of the drawings, the same elements are denoted by the same reference numerals, and a duplicate explanation is omitted as appropriate.

(Reference Example)

Figure 2A:
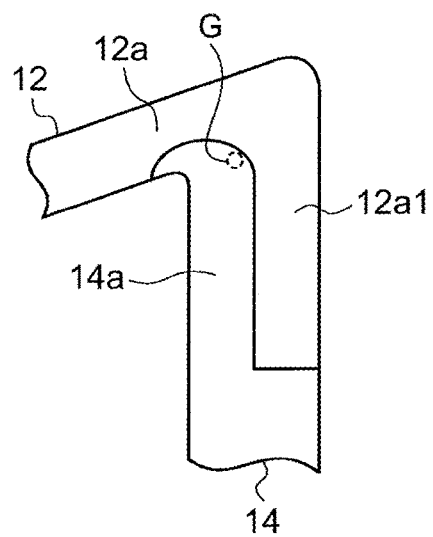
FIG. 2A is a cross-sectional view taken along the line A-A of the two-color molded article shown in FIG. 1.
Figure 2B:
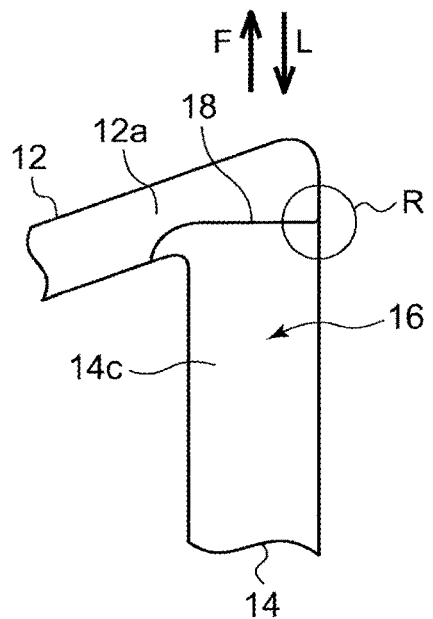
FIG. 2B is a cross-sectional view taken along the line B-B of the two-color molded article shown in FIG. 1.
Figure 2C:
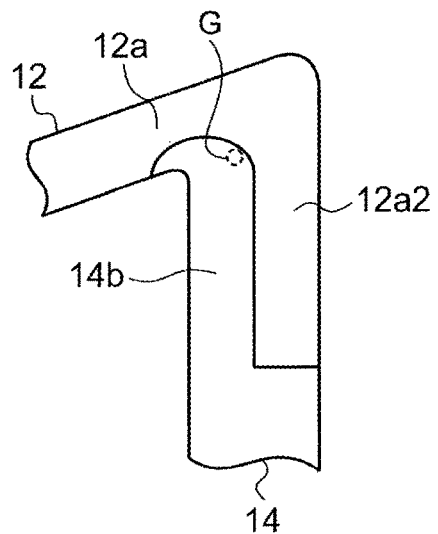
FIG. 2C is a cross-sectional view taken along the line C-C of the two-color molded article shown in FIG. 1.

First, a phenomenon that can be a problem in a two-color molded article will be described with reference to a reference example. FIG. 1 is a cross-sectional perspective view of a main part of a two-color molded article according to the reference example. FIG. 2A is a cross-sectional view taken along the line A-A of the two-color molded article shown in FIG. 1, FIG. 2B is a cross-sectional view taken along the line B-B of the two-color molded article shown in FIG. 1, and FIG. 2C is a cross-sectional view taken along the line C-C of the two-color molded article shown in FIG. 1.

A two-color molded article 10 includes a first resin part 12 having a predetermined shape and a second resin part 14 in contact with the first resin part 12 so as to at least partially overlap the first resin part 12. The first resin part 12 is made of a transparent resin material such as acrylic resin or polycarbonate resin. The first resin part 12 is disposed on the outer side (surface side) in a mode in which the two-color molded article 10 is used.

The first resin part 12 has a substantially L-shaped cross section. The first resin part 12 includes a first surface portion 12a extending so as to face a left and right direction in FIG. 1 (extending in the left and right direction in FIG. 1), a second surface portion 12b extending so as to face an up and down direction in FIG. 1 (extending in the up and down direction in FIG. 1) different from the direction in which the first surface portion 12a faces, and a bent portion 12c connecting the first surface portion 12a and the second surface portion 12b.

The second resin part 14 includes a first region 14a, a second region 14b and a single layer region 14c. The first region 14a is in contact with the back side of a first portion 12a1 (see FIG. 2A) constituting a part of the first surface portion 12a so as to overlap the first portion 12a1. The second region 14b is in contact with the back side of a second portion 12a2 (see FIG. 2C) constituting a part of the first surface portion 12a so as to overlap the second portion 12a2. The second portion 12a2 is different from the first portion 12a1. The single layer region 14c is provided between the first region 14a and the second region 14b and is adapted to fill a penetrating portion 16 formed between the first portion 12a1 and the second portion 12a2. The second resin part 14 is made of an opaque colored (specifically, black or gray) resin material.

In the case where the two-color molded article 10 thus configured is used as a component of a headlamp of a vehicle lamp, the following phenomenon often occurs when the first resin part 12 is disposed to be on the surface side and the first surface portion 12a is disposed to face the front of the vehicle.

In the two-color molded article 10 shown in FIG. 1, the first resin part 12 is formed as a primary molded article, and then, the second resin part 14 is formed as a secondary molded article so as to be formed on a part of the first resin part 12. In a mold used for forming the secondary molded article, cavities corresponding to the first region 14a and the second region 14b are narrow, and thus, gas is difficult to escape when forming the second resin part 14. Therefore, in the mold used for forming the secondary molded article of the two-color molded article 10, a cavity having a shape corresponding to the penetrating portion 16 is formed so that the gas can easily escape during the injection molding.

In this way, it is suppressed that a gas G remains on the inner side (filing end portion) of the first region 14a and the second region 14b of the second resin part 14 and thus air bubbles (underfill) are generated. However, the inventors of the present invention have conceived that another problem may arise by providing the penetrating portion 16.

The second resin part 14 has the single layer region 14c formed so as to fill the penetrating portion 16 (see FIG. 2B). The single layer region 14c is filled up to a position close to the first surface portion 12a and its joint portion 18 in contact with the transparent first resin part 12 is flat. In this case, a viewer looking the direction of an arrow L from the front sees that a part of the first surface portion 12a shines by the reflected light at the joint portion 18.

Figure 3A:
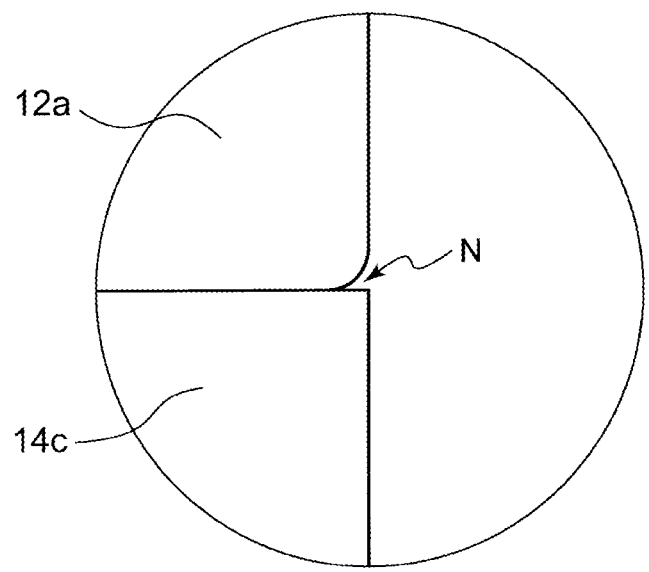
FIG. 3A is an enlarged view of the area R shown in FIG. 2B.
Figure 3B:
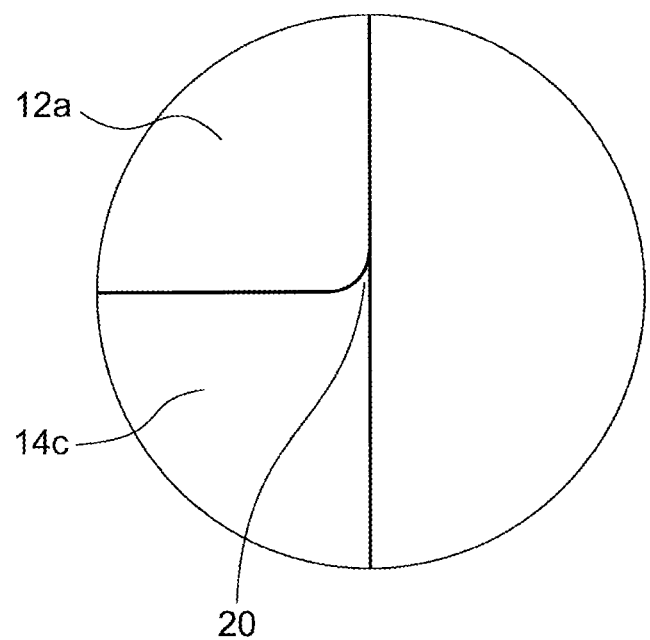
FIG. 3B is a view showing a situation in which a second resin part penetrates into a clearance shown in FIG. 3A.

FIG. 3A is an enlarged view of the area R shown in FIG. 2B, and FIG. 3B is a view showing a situation in which the second resin part 14 penetrates into a clearance shown in FIG. 3A.

In the two-color molded article 10, the first resin part 12 is formed, and then, the second resin part 14 is formed by injection molding. When forming the first resin part 12, a first resin material forming the first resin part 12 is filled in a state in which a primary core-side mold is placed at a portion corresponding to the single layer region 14c. At that time, the resin material cannot be filled up to the corner of the cavity of the mold, and thus, a minute notch (clearance) N of about 0.01 mm is sometimes formed. The notch N is not necessarily continuous, but a plurality of notches may be formed dispersedly. As shown in FIG. 2B, a viewer looking the direction of the arrow L from the front recognizes the scattered light by the notch N, which may be a cause of deterioration in appearance quality.

Furthermore, when the second resin part 14 is injection-molded as a secondary molded article with respect to the first resin part 12 having the notch N shown in FIG. 3A, the notch N is partially filled, and thus, a filling portion 20 is formed (see FIG. 3B). Alternatively, an end line of the joint portion 18 does not necessarily become a uniform straight when the entire region of the notch N is filled. Also in this case, a viewer looking the direction of the arrow L from the front recognizes the scattered light by the filling portions 20 or uneven end lines, which may be a cause of deterioration in appearance quality.

(Embodiment)

Figure 4:
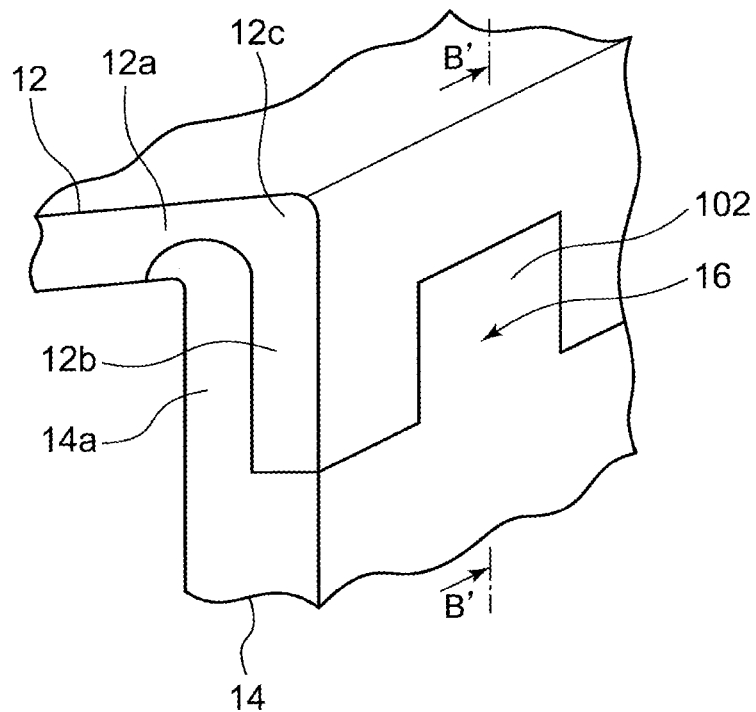
FIG. 4 is a cross-sectional perspective view of a main part of a two-color molded article according to an embodiment.
Figure 5:
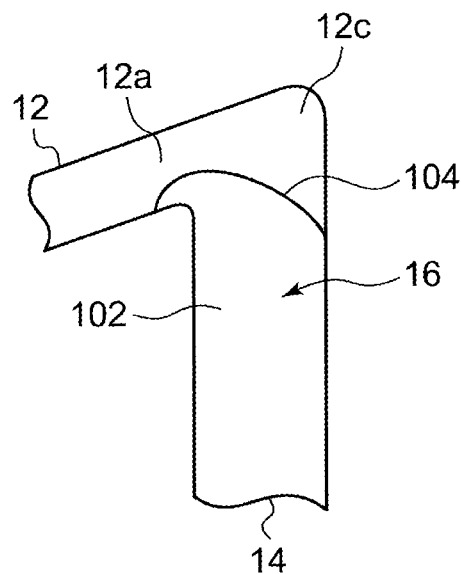
FIG. 5 is a cross-sectional view taken along the line B'-B' of the two-color molded article shown in FIG. 4.

In consideration of the above situations, the inventors of the present invention have conceived a two-color molded article having the following configuration. FIG. 4 is a cross-sectional perspective view of a main part of a two-color molded article according to an embodiment. FIG. 5 is a cross-sectional view taken along the line B'-B' of the two-color molded article shown in FIG. 4.

A two-color molded article 100 according to the present embodiment is different from the two-color molded article 10 according to the reference example in the configuration of the single layer region of the second resin part. The other configurations are almost the same as those of the two-color molded article 10. The same elements are denoted by the same reference numerals, and a duplicate explanation is omitted as appropriate.

The two-color molded article 100 includes a joint portion 104 in contact with the bent portion 12c in a single layer region 102. The joint portion 104 is formed in a convex shape with respect to the bent portion 12c. In this way, an interface between the bent portion 12c of the first resin part 12 and the joint portion 104 of the second resin part 14 is not flat. Therefore, the rate at which external light is directly reflected to a viewer when seeing the interface from the side of the first resin part 12 is reduced, so that the appearance quality of the two-color molded article 100 is improved. Meanwhile, the joint portion 104 may be formed in a wedge shape with respect to the bent portion 12c.

The joint portion 104 according to the present embodiment has a curved surface. In this way, the rate at which external light is directly reflected to a viewer when seeing the interface from the side of the first resin part 12 is further reduced. Further, although the whole of the joint portion 104 according to the present embodiment is a curved surface, a flat surface may be partially included.

R of the curved surface of the joint portion 104 is in the range of 1 to 3 mm. In this way, it is easy for external light to scatter and it is possible to reduce the occurrence of an unfilled region in which resin is not filled in the corner of the mold.

The joint portion 104 may have an inclined surface formed so as to be away from the bent portion 12c toward the surface (right surface in FIG. 5) from the inside of the single layer region 102. In this way, a part of the joint portion 104 is seen farther as viewed from the side of the bent portion 12c of the first resin part 12, so that the influence of reflection of external light at the interface can be reduced.

Figure 6A:
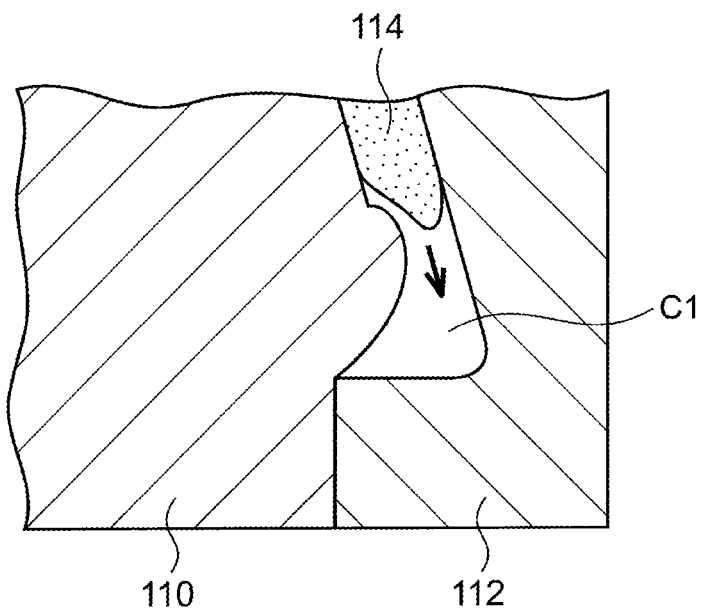
FIGS. 6A and 6B are process views showing an injection molding method according to the present embodiment.
Figure 6B:
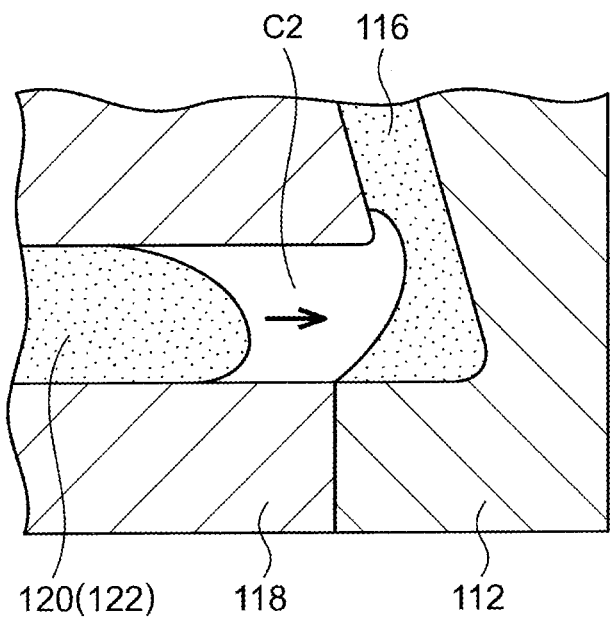

FIGS. 6A and 6B are process views showing an injection molding method according to the present embodiment. First, as shown in FIG. 6A, a primary core-side mold 110 and a cavity-side mold 112 are clamped. Then, in this state, a transparent resin material 114 supplied from a heating cylinder is injected into a primary space portion CI to form a primary molded article 116.

Then, the primary core-side mold 110 and the cavity-side mold 112 are opened, the primary core-side mold 110 is replaced with a second core-side mold 118, and then, the second core-side mold 118 and the cavity-side mold 112 are clamped. Then, in this state, a colored (black) resin material 120 supplied from the heating cylinder is injected into a secondary space portion C2 to form the secondary molded article 122. In this way, the two-color molded article 100 in which the primary molded article 116 and the secondary molded article 122 are integrated is completed.

Hereinabove, the present invention has been described with reference to the embodiments. It is understood by those skilled in the art that these embodiments are examples and that various modifications can be made to combinations of the respective components and respective processing process thereof and that such modifications are also within the scope of the present invention.

What is claimed is:

1. A two-color molded article comprising:
   a first resin part; and
   a second resin part in contact with the first resin part, the second resin part at least partially overlapping the first resin part,
   wherein the first resin part includes:
      a first surface portion;
      a second surface portion extending in a second direction different from a first direction in which the first surface portion extends; and
      a bent portion connecting the first surface portion and the second surface portion,
   wherein the second resin part includes:
      a first region in contact with a back side of a first portion of the first surface portion so as to overlap the first portion,
      a second region in contact with a back side of a second portion of the first surface portion so as to overlap the second portion, the second portion being different from the first portion, and
      a single layer region provided between the first region and the second region in a direction perpendicular to the first and second directions and including a penetrating portion formed between the first portion and the second portion, the penetrating portion protruding in the second direction toward the first surface portion,
   wherein the single layer region has a joint portion in contact with the bent portion, and
   wherein the joint portion is formed in a convex shape with respect to the bent portion, and wherein along the direction perpendicular to the first and second directions, the first and second regions of the second resin part are covered by the first and second portions of the first resin part, respectively, and the single layer region is not covered by the first resin part.

2. The two-color molded article according to claim 1, wherein the joint portion has a curved surface.

3. The two-color molded article according to claim 1, wherein the whole of the joint portion is a curved surface.

4. A two-color molded article comprising:
   a first resin part; and
   a second resin part in contact with the first resin part, the second resin part at least partially overlapping the first resin part,
   wherein the first resin part includes:
      a first surface portion;
      a second surface portion extending in a second direction different from a first direction in which the first surface portion extends; and
      a bent portion connecting the first surface portion and the second surface portion,
   wherein the second resin part includes:
      a first region in contact with a back side of a first portion of the first surface portion so as to overlap the first portion,
      a second region in contact with a back side of a second portion of the first surface portion so as to overlap the second portion, the second portion being different from the first portion, and
      a single layer region provided between the first region and the second region in a direction perpendicular to the first and second directions and including a penetrating portion formed between the first portion and the second portion, the penetrating portion protruding in the second direction toward the first surface portion,
   wherein the single layer region has a joint portion in contact with the bent portion, and
   wherein the joint portion is formed in a convex shape with respect to the bent portion,
   wherein the joint portion has a curved surface,
   wherein the joint portion is formed such that R of the curved surface is in the range of 1 to 3 mm.

5. A two-color molded article comprising:
   a first resin part; and
   a second resin part in contact with the first resin part, the second resin part at least partially overlapping the first resin part,
   wherein the first resin part includes:
      a first surface portion;
      a second surface portion extending in a second direction different from a first direction in which the first surface portion extends; and
      a bent portion connecting the first surface portion and the second surface portion,
   wherein the second resin part includes:
      a first region in contact with a back side of a first portion of the first surface portion so as to overlap the first portion,
      a second region in contact with a back side of a second portion of the first surface portion so as to overlap the second portion, the second portion being different from the first portion, and
      a single layer region provided between the first region and the second region and including a penetrating portion formed between the first portion and the second portion, wherein the single layer region has a joint portion in contact with the bent portion,
wherein the joint portion is formed in a convex shape with respect to the bent portion, and
wherein the joint portion has an inclined surface formed so as to be away from the bent portion toward a surface from the inside of the single layer region.

\* \* \* \* \*